US012315360B2

(12) United States Patent
Hutain

(10) Patent No.: US 12,315,360 B2
(45) Date of Patent: May 27, 2025

(54) GENDER REVEAL SYSTEM

(71) Applicant: Royce Hutain, Huntingon Beach, CA (US)

(72) Inventor: Royce Hutain, Huntingon Beach, CA (US)

( * ) Notice: Subject to any disclaimer, the term of this patent is extended or adjusted under 35 U.S.C. 154(b) by 0 days.

(21) Appl. No.: 18/351,692

(22) Filed: Jul. 13, 2023

(65) Prior Publication Data

US 2025/0022352 A1 Jan. 16, 2025

(51) Int. Cl.
*G08B 5/36* (2006.01)

(52) U.S. Cl.
CPC .................................... *G08B 5/36* (2013.01)

(58) Field of Classification Search
CPC .................................................... G08B 5/36
See application file for complete search history.

(56) References Cited

U.S. PATENT DOCUMENTS 4,779,871 A * 10/1988 Rasmussen ............... A63F 9/00 273/459
5,515,344 A * 5/1996 Ng ..................... A61B 10/0012 368/10
5,769,859 A * 6/1998 Dorsey .............. A61B 17/3201 606/119
6,262,889 B1 * 7/2001 Newman ................... G06F 1/20 361/689
10,843,098 B1 * 11/2020 Simonsen .............. A63H 27/10
11,161,033 B1 * 11/2021 Rothert ................. A63F 9/0669
12,097,444 B2 * 9/2024 Simonsen .............. A63H 27/10
12,101,576 B2 * 9/2024 Ogita .................... H04N 21/431
2003/0137258 A1 * 7/2003 Piepgras ................ H05B 45/20 315/312
2006/0110697 A1 * 5/2006 Taffinder ................. C11C 5/008 431/291
2006/0238326 A1 * 10/2006 Repetto ................. H01L 27/156 340/461
2008/0004953 A1 * 1/2008 Ma ..................... G06Q 30/0242 705/14.66
2009/0189775 A1 * 7/2009 Lashina .................. G09F 27/00 715/810
2011/0030255 A1 * 2/2011 Morris .................. G09F 15/005 40/610
2011/0283190 A1 * 11/2011 Poltorak ................. G06F 3/167 704/258
2011/0288961 A1 * 11/2011 Boyington ......... G06Q 30/0641 705/27.1

(Continued)

FOREIGN PATENT DOCUMENTS

EP 3819882 A1 * 5/2021 ............. G06N 5/022

*Primary Examiner* — Hoi C Lau
(74) *Attorney, Agent, or Firm* — Eric Karich; Karich & Associates

(57) ABSTRACT

A gender reveal system has a light display device, a mounting device for mounting the light display device on the pregnant person, and a controller device that is operably connected to the light display device. The controller device is configured to receive an input that indicates that the gender of the unborn baby is either male or female, and transmit a gender revealing light sequence to the light display device. The light display device displays a substantially blue color in the event that the input of the controller device indicates male, and a substantially pink color in the event that the input of the controller device indicates female.

13 Claims, 3 Drawing Sheets

(56) References Cited

U.S. PATENT DOCUMENTS

| | | | | |
|---|---|---|---|---|
| 2012/0162259 | A1* | 6/2012 | Sakai | G02B 27/0093 345/634 |
| 2012/0289842 | A1* | 11/2012 | Gutman | G16H 50/20 600/502 |
| 2016/0320795 | A1* | 11/2016 | Daley, III | G06F 1/163 |
| 2016/0373398 | A1* | 12/2016 | Donahoe | H04L 67/306 |
| 2019/0294388 | A1* | 9/2019 | Miyashita | G06T 19/006 |
| 2019/0350066 | A1* | 11/2019 | Herf | H05B 47/105 |
| 2020/0147510 | A1* | 5/2020 | Holmes | A63H 37/00 |
| 2020/0252637 | A1* | 8/2020 | Tagami | H04N 21/435 |
| 2020/0387937 | A1* | 12/2020 | Sheth | G06Q 30/0276 |
| 2023/0255137 | A1* | 8/2023 | McMahan | A01C 7/105 340/684 |
| 2023/0412766 | A1* | 12/2023 | Hayata | H04N 7/152 |
| 2024/0091661 | A1* | 3/2024 | Simonsen | A63H 27/10 |
| 2024/0303898 | A1* | 9/2024 | Nagahara | G06Q 50/01 |
| 2024/0316984 | A1* | 9/2024 | Rucker | F21V 35/00 |
| 2025/0022352 | A1* | 1/2025 | Hutain | G08B 5/36 |

* cited by examiner

GENDER REVEAL SYSTEM

BACKGROUND OF THE INVENTION

Field of the Invention

This invention relates to a gender reveal system for use at a gender reveal party for revealing the gender of a baby.

Description of Related Art

It is becoming increasingly popular to have a party to celebrate an upcoming birth, and to include a revelation of the gender of the expected baby at this party, in what is typically called a gender reveal party.

Typical gender reveal parties may include, for example, a balloon filled with colored glitter, so that when the balloon is popped, a colored glitter is released, blue for a boy and pink for a girl.

It is desirable to provide a simple to use but entertaining system and method for revealing a gender of a baby for these gender reveal parties.

SUMMARY OF THE INVENTION

The present invention teaches certain benefits in construction and use which give rise to the objectives described below.

The present invention provides a gender reveal system for revealing the gender of an unborn baby of a pregnant person. The gender reveal system comprises a light display device, a mounting device for mounting the light display device on the pregnant person, and a controller device that is operably connected to the light display device. The controller device comprises a computer processor, a computer memory, a transceiver, and a battery. The controller device is configured to receive an input that indicates that the gender of the unborn baby is either male or female, and transmit a gender revealing light sequence to the light display device, wherein the light display device displays a substantially blue color in the event that the input of the controller device indicates male, and a substantially pink color in the event that the input of the controller device indicates female.

A primary objective of the present invention is to provide a gender reveal system having advantages not taught by the prior art.

Another objective is to provide a light display device mounted to a pregnant person that has a gender revealing light sequence to reveal whether an unborn baby is a boy or a girl at a gender reveal party.

A further objective is to provide a gender reveal system that incorporates the light display device as well as several accessories containing lights to create an entertaining reveal for guests at a gender reveal party.

A further objective is to provide a computer program that allows the user to control different aspects of the gender reveal light sequence and to start the gender reveal light sequence from a personal computer device.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a gender reveal system for revealing the gender of an unborn baby with the use of a light display device.

Figure 1:
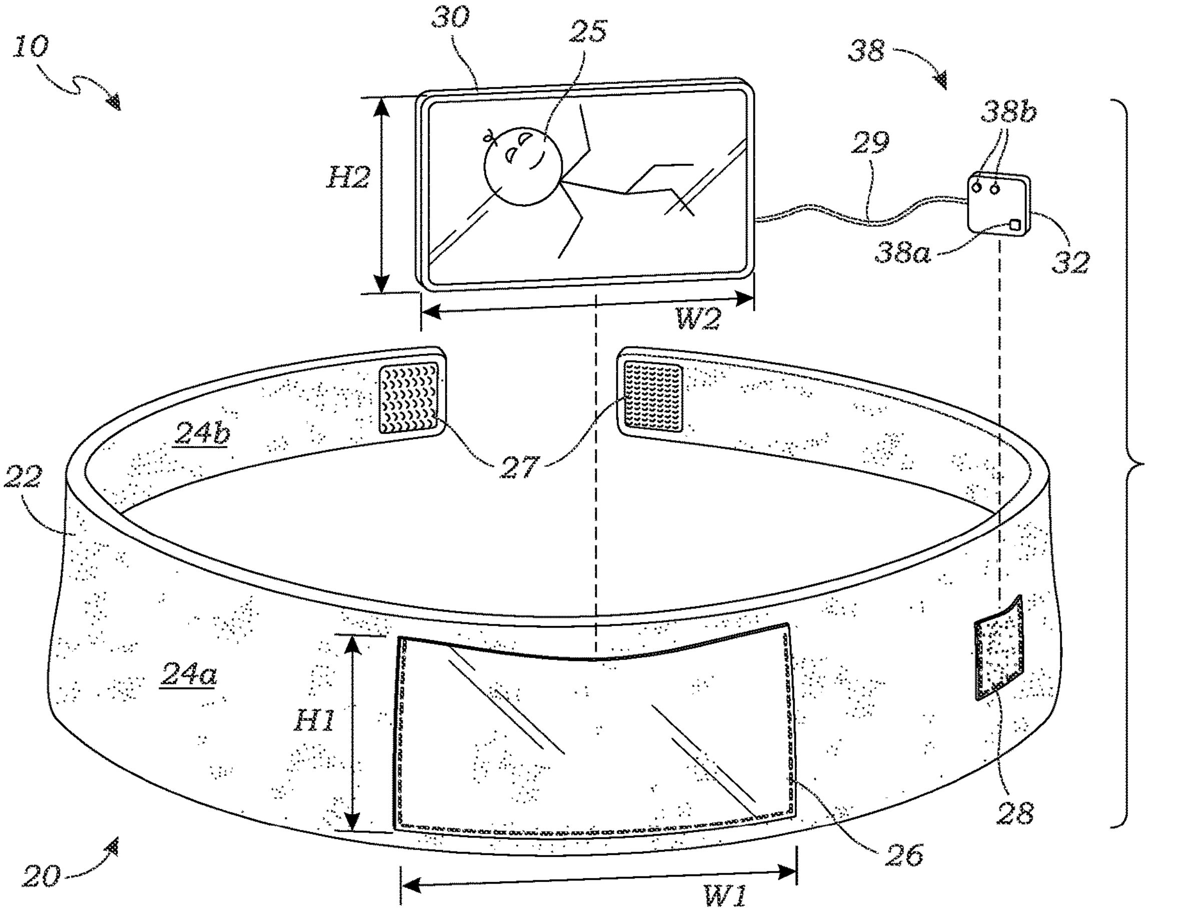
FIG. 1 is an exploded perspective view of a gender reveal system according to one embodiment of the present invention, illustrating a mounting device, a light display device, and a controller device.
Figure 2:
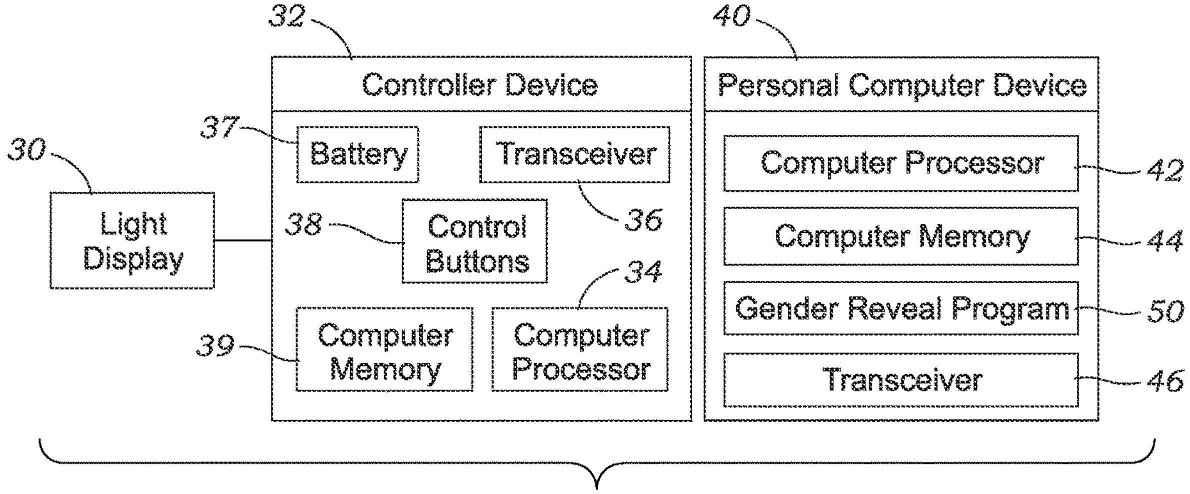
FIG. 2 is a block diagram thereof, further showing a personal computer device that may be used to customize the gender reveal, and also to remotely actuate the reveal.

FIG. 1 is an exploded perspective view of a gender reveal system 10 according to one embodiment of the present invention, illustrating a mounting device 20, a light display device 30, and a controller device 32. FIG. 2 is a block diagram thereof, further showing a personal computer device 40 that may be used to customize the gender reveal, and also to remotely actuate the reveal. As shown in FIGS. 1-2, the mounting device 20 is adapted to receive the light display device 30 and the controller device 32 for mounting on a pregnant person, wherein the controller device 32 may be used to control the operation and actuation of the light display device 30 for revealing the gender of an unborn baby, as discussed in more detail below. In some implementations, the light display device 30 may be used to reveal that a person is pregnant, instead of or in addition to revealing the gender, also discussed below.

In the present embodiment, the mounting device 20 is in the form of a band 22 for fastening around the pregnant person's waist, the band 22 having a front surface 24*a* with a means for holding 26 the light display device 30, and a rear surface 24*b* that contacts the pregnant person during wear. In various embodiments, the band 22 may be constructed of a flexible material (e.g., fabric, elasticized fabric, flexible plastic, etc.) and includes a fastener 27 for securing the band 22 around the pregnant person's waist. The fastener 27 may be any form of fastener known in the art, e.g., a hook and loop fastener, a buckle, ties, etc.

The means for holding 26 in this embodiment is a pocket sewn to the band 22; however, in other embodiments, other forms of holding, mounting, or fastening may be used, including but not limited to hooks and loops fasteners, straps, snaps, buckles, and/or any other structures known in the art for holding the light display device 30.

While the illustrated band 22 is one example of the mounting device 20, other forms of mounting devices 20 may be used, such as a lanyard, vest, shirt, etc., or any suitable structure for mounting the light display device 30 to the pregnant person's torso. In some embodiments, the band 22 further includes a means for holding 28 the controller device 32, which may be any means as described above, in this embodiment being in the form of a controller compartment 28 on the front surface 24*a* of the band 22 for receiving the controller device 32 (although it may alternatively on a rear surface 24*b* as well).

The controller device 32 is operably connected to the light display device 30. In this embodiment, a cable 29 connects the controller device 32 and light display device 30. The band 22 may include passthrough apertures (not shown) between the display compartment 26 and the controller compartment 28 for feeding the cable 29 through. However, in other embodiments, the controller device 32 and the light display device 30 are wirelessly connected, or connected in any other way known in the art.

As shown in FIGS. 1-2, the display compartment 26 and the controller compartment 28 may each be fastened to the band 22 via stitching, or fastened via any other equivalent fastener 27 known in the art. In some implementations, the compartments may be integrally formed with the band 22, or alternatively be removably attached (i.e., using hook and loop fasteners, buttons, etc.). Furthermore, the display compartment 26 may be at least partially constructed of a transparent or semi-transparent material, so the light display device 30 is visible when illuminated. In this embodiment, the display compartment 26 is defined by a height H1 and a width W1 adapted for receiving the light display device 30, discussed further below.

As shown in FIGS. 1-2, the light display device 30 may be in the form of a lighted screen having a height H2 and a width W2, H2 and W2 being less than H1 and W1 of the display compartment 26, so that the light display device 30 fits within the display compartment 26. In some embodiments, H2 and W2 is slightly less than H1 and W1, the term "slightly less" being defined to include sizes so that the light display device 30 fits snugly into the compartment 26 so that friction retains the light display device 30 in the compartment 26.

In some embodiments, the light display device 30 includes an LED matrix, wherein in one embodiment the LED matrix is configured so that each LED is individually addressable. In another embodiment, the light display device 30 includes an electroluminescent panel, an LCD screen, or any other type of display screen known in the art.

As illustrated, the controller device 32 comprises a computer processor 34, a computer memory 35, a transceiver 36, and a battery 37 which are operably connected to the light display device 30. In this embodiment, the controller device 32 further includes a control mechanism 38 such as buttons, which may include, for example, an on/off switch **38*a* (or actuation switch), gender buttons 38*b* to control whether the outcome is boy or girl, and/or a simple start button to start the gender reveal sequence, and any other form of control buttons, switches, etc., known in the art, along with other non-mechanical controls (e.g., voice command, etc.). Obviously, other control button configurations may be included, to be determined by one skilled in the art. In some embodiments, the control buttons 38 are on a touch screen, but in other embodiments the control buttons 38 may be analogue. In this embodiment, the controller contains the transceiver 36 which is adapted to communicate with the personal computer device 40, as discussed below. If operated by the personal computer device 40, control buttons are not required on the controller device 32**, although an on/off switch may be used, and/or a pairing button (not shown). Since these elements are known in the art, they are not described in greater detail herein.

As shown in FIG. 2, the personal computer device 40 may include a computer processor 42, a computer memory 44, and a transceiver 46, wherein the computer memory 35 of the personal computer device 40 includes a gender reveal program 50. The gender reveal program 50 operably installed in the computer memory 44 may be configured to receive an input 52 that indicates the gender of the unborn baby, and transmit a gender revealing light sequence 25 to the controller device 32. However, in other embodiments the controller device 32 could operate the gender revealing light sequence 25 via the control buttons 38. The gender revealing light sequence 25 (shown in FIGS. 1 and 4) is described in greater detail below. The gender reveal program 50 may be operably installed on the personal computer device 40 as in an "app.," but alternatively the gender reveal program 50 may be accessed via an internet browser, or any other similar means known in the art.

Each of the components of the controller device 32 and the personal computer device 40 may be operably connected to the processors 34 and 42 by electrical connectors or any other operative connection known in the art, related art, or developed later. Each computer processor 34, 42 and computer memory 35, 44 may be any form of processor or processors, memory chip(s) or devices, microcontroller(s), and/or any other devices known in the art, related art, or developed later. Each battery supplies power to the processor, and may be rechargeable via an external power source, or in alternative embodiments may be replaceable. Other devices or systems known in the art for supplying power may also be utilized, including various forms of charging a battery, and/or generating power directly using piezoelectric, solar, or other devices. The transceivers 36, 46 may communicate via local communications protocols such as Bluetooth®, cellular networks, WIFI, and/or any other communications standards known in the art.

For purposes of this application, the term "computer" (or any other similar term, such as "server," "computer device," "electronic device," "user device," etc.), refer to any form of electronic device or plurality of devices having at least one computer processor, e.g., a central processing unit (CPU), and some form of computer memory having a capability to store data. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smart phone, a tablet, or any form of electronic device capable of functioning as described herein. Furthermore, while multiple devices may be described, these may all be performed on a single computer device, or multiple associated computer devices, according to the teachings of one skilled in the art.

The term "computer memory" as used herein refers to any tangible, non-transitory storage that participates in providing instructions to a processor for execution. Such a medium may take many forms, including but not limited to, non-volatile media, volatile media, and any equivalent media known in the art. Non-volatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

Figure 3:
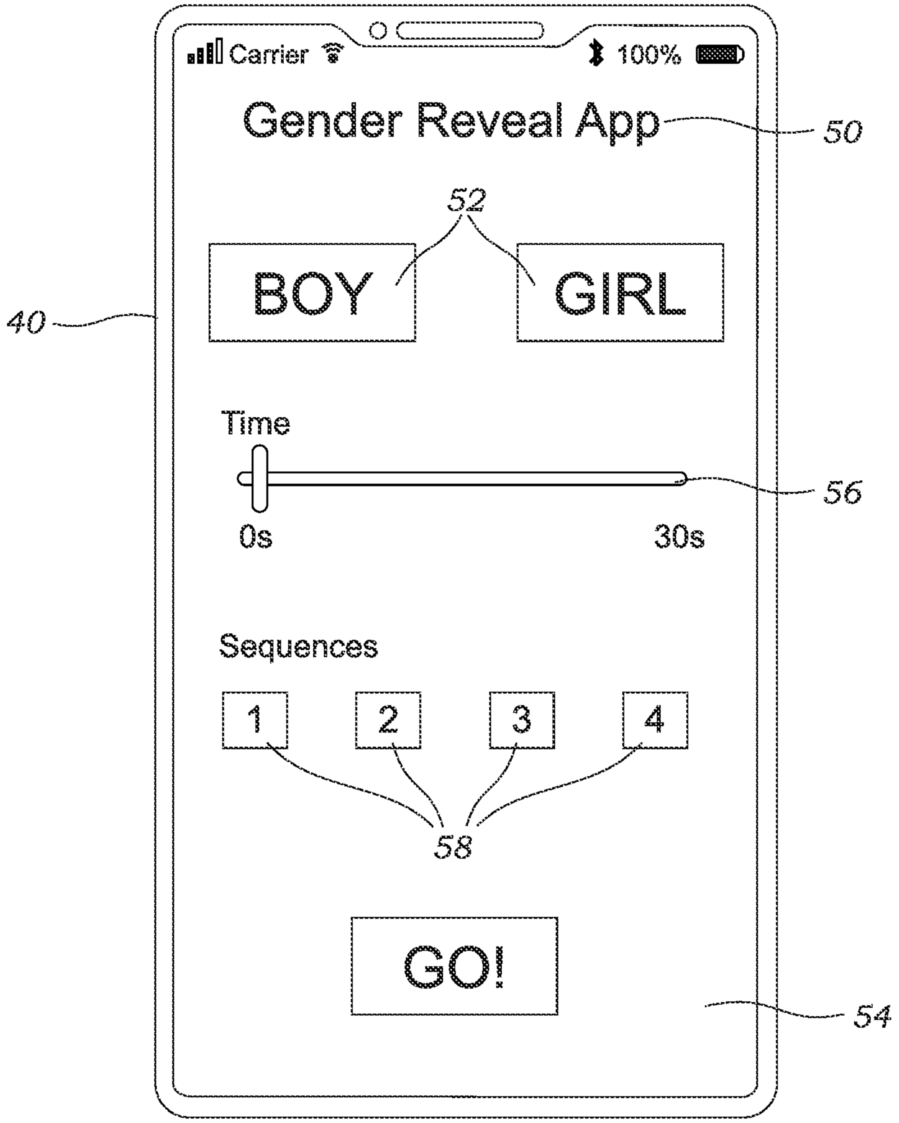
FIG. 3 illustrates the personal computer device displaying a control screen of a gender reveal program.

FIG. 3 illustrates the personal computer device 40 displaying a control screen 54 of the gender reveal program, generated by the gender reveal program 50 of FIG. 2. As shown in FIG. 3, in this embodiment, the control screen 54 may include an input 52 for selecting the gender of the baby, in this case in the form of gender selection buttons. While a simple boy/girl embodiment is shown, this may further include options for twins, triplets, etc. A time selector 56, in this case in the form of a time slider 56, may be used to select the duration of the gender revealing light sequence 25; however other embodiments could include buttons with different times, or it could start from a higher number of seconds or it could allow for a higher or lower amount of time to be selected.

In addition, the embodiment shows four different sequence option buttons 58 for different gender revealing light sequences, but other embodiments could have more or less options, or it could be split up into more categories to control specific aspects of the light sequence 25; for instance if there was a selection of whether the lights flash, or if there is a countdown or not. As previously mentioned, in some uses, the light sequence may be used to reveal that a person is pregnant, instead of or in addition to revealing the gender, i.e., a white colored light sequence, ultrasound image, etc. The gender reveal program 50 could also consist of multiple different pages that allow the user to control various aspects of the gender revealing light sequence 25. Any interface that allows the user to customize the gender revealing light sequence 25 is acceptable. As discussed, this embodiment of the gender reveal program 50 is an application for a mobile device; other embodiments could be software for computers or other personal computer devices. The control screen 54 shown is also only one possible screen of the gender reveal program, which may include other screens such as a title screen, a settings screen, etc., as is well-known in the art. The control screen 54 may further include options for synching other lighting devices, as discussed below, as well as selecting lighting routines for these devices.

Figure 4:
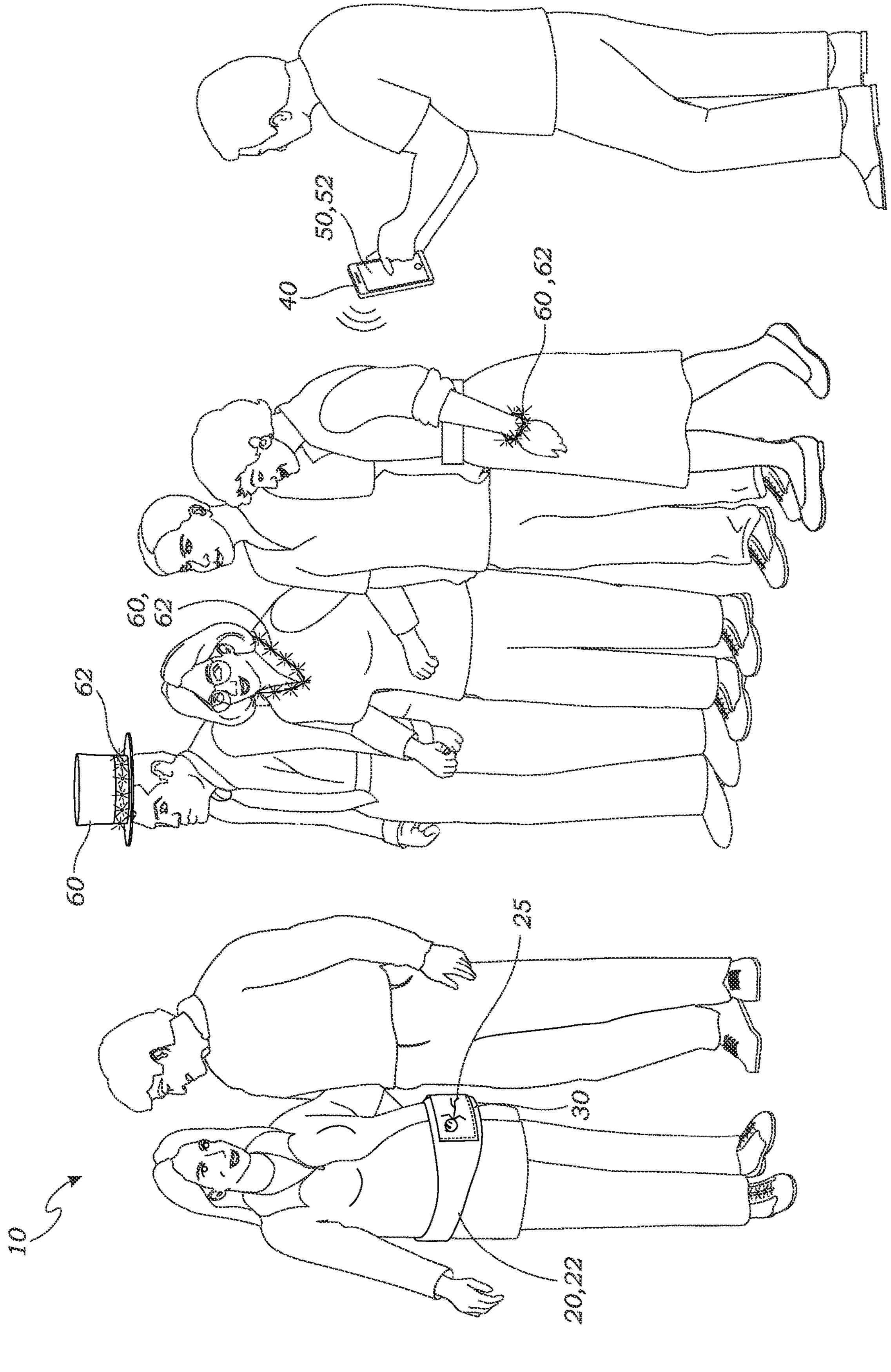
FIG. 4 illustrates a gender reveal party wherein a pregnant person and party guests are using the gender reveal system.

FIG. 4 illustrates a gender reveal party wherein the pregnant person and party guests are using the gender reveal system 10. As illustrated, in one use of the present invention, the pregnant person wears the mounting device 20 with the light display device 30 mounted thereupon. For clarity, the mounting device 20 is shown worn over the clothing, but in practice it would typically be worn under a shirt, with the lighting being visible through the clothing.

As shown in FIG. 4, a party guest holds the personal computer device 40 with the gender reveal program 50 installed, for the purpose of customizing the lighting sequence, and for actuating the actual reveal. Obviously, in some uses, the pregnant person may be controlling the gender reveal program 50, or any other person or system.

In use, the controller device 32 receives the input 52 that indicates that the gender of the unborn baby is either male or female, either via the control buttons 38 or via a transmittal from the gender reveal program 50. The gender revealing light sequence 25 is then transmitted to the light display device 30. It is expected that the sequence 25 would initially be random flashing colors, perhaps alternating between blue and pink, to build suspense. At the climax, the light display device 30 displays a substantially blue color in the event that the input of the controller device 32 indicates male, and a substantially pink color in the event that the input of the controller device 32 indicates female. In various implementations, the gender revealing light sequence 25 could be in the form of a single panel of color, or an animation, figure, lettering/numbering such as "It's a Boy!" a countdown, etc., or any other type of sequence that may be devised by one skilled in the art. For purposes of this application, the terms "substantially blue" and "substantially pink" are defined to include any display of blue or pink, or similar colors, that it is clear to the user whether the baby is a boy or a girl, and the display could be entirely blue or pink, or it would include other colors and figures, so long as there is enough blue or pink, or similar color, to make the indication clear to an ordinary observer.

As previously mentioned, the gender reveal system 10 may further include the at least one wearable accessory 60 having at least one light 62 incorporated therein to be worn by at least one of the party guests. The at least one light 62 may be operatively controlled by the system 10 and adapted change color in sync with the light display device 30 via an accessory transceiver (not shown), or alternatively may be manually activated (e.g., via a switch/button/etc.). For example, if the light display device 30 flashes blue to indicate the unborn baby is a boy, the at least one wearable accessory 60 will also light up blue. As shown in FIG. 4, the at least one wearable accessory 60 could include bracelets, hats, and necklaces, though others could include belts, shirts, glasses, or any wearable accessories 60. The accessory transceiver may interface with the personal computer device 40 in the same way as the transceiver 36 in the controller device 32 to change color in sync with the light display device 30.

As with the light display device 30, it is anticipated that the system 10 would first display a flashing color changing show to build anticipation, across the light display device 30 and the wearable accessories 60. At the climax, they may all turn either blue or pink, thereby making the reveal.

In some embodiments, the light display device 30 may be removed from the mounting device 20 and held by hand, or placed on a podium, stage, table, etc., as a standalone device to display the light sequence(s). Furthermore, the device 30 may be used as a standalone device after the gender or pregnancy has been revealed. For example, the light display device 30 could be set into a frame and hung on a wall/placed on a mantle/etc. with an image of the mother, infant, ultrasound, etc., or a changing light sequence, according to the desires of the user.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A gender reveal system for revealing the gender of an unborn baby of a pregnant person, the gender reveal system comprising:

a light display device;

a mounting device for mounting the light display device on the pregnant person; and a controller device that is operably connected to the light display device, the controller device comprising a computer processor, a computer memory, a transceiver, and a battery, the controller device being configured to:

receive an input that indicates that the gender of the unborn baby is either male or female, and transmit a gender revealing light sequence to the light display device, wherein the light display device displays a substantially blue color in the event that the input of the controller device indicates male, and a substantially pink color in the event that the input of the controller device indicates female.

2. The gender reveal system of claim 1, wherein the transceiver of the controller device is adapted to communicate with a personal computer device having a computer processor, a computer memory, and a transceiver, and wherein the computer memory of the personal computer device includes a gender reveal program.

3. The gender reveal system of claim 2, wherein the gender reveal program is configured to receive the input that indicates the gender of the unborn baby, and transmit the gender revealing light sequence to the controller device.

4. The gender reveal system of claim 1, further comprising at least one wearable accessory having at least one light incorporated therein, the at least one light being adapted change color in sync with the light display device via an accessory transceiver.

5. The gender reveal system of claim 1, wherein the mounting device is in the form of a band for fastening around the pregnant person's waist.

6. The gender reveal system of claim 5, wherein the band includes a front surface having a means for mounting the light display device.

7. The gender reveal system of claim 1, wherein the light display device includes an LED matrix.

8. The gender reveal system of claim 7, wherein each LED is individually addressable.

9. The gender reveal system of claim 1, wherein the light display device is an electroluminescent panel.

10. A gender reveal system for revealing the gender of an unborn baby of a pregnant person, the gender reveal system comprising:

a computer device having a computer processor, a computer memory, and a transceiver, wherein the computer memory of the computer device includes a gender reveal program operably installed in the computer memory and configured to receive an input from a user that indicates that the gender of the unborn baby is either male or female, and transmit a gender revealing light sequence to a controller device;

a light display device;

a mounting device for mounting the light display device on the pregnant person; and the controller device is operably connected to the light display device, the controller device comprising a computer processor, a computer memory, a transceiver, and a battery, the controller device being configured to:

receive the input from the computer device that includes the gender revealing light sequence received from, the computer device, and transmit the gender revealing light sequence to the light display device.

11. The gender reveal system of claim 1, further comprising:

at least one wearable accessory having at least one light adapted to be worn by a party guest, the at least one light being operatively controlled by the system and adapted change color in sync with the light display device.

12. A method for performing a gender reveal for a pregnant woman, the method comprising the steps of:

providing a gender reveal system comprising a computer device having a computer processor, a computer memory, and a transceiver, wherein the computer memory of the computer device includes a gender reveal program operably installed in the computer memory; and a controller device operably connected to a light display device;

mounting the light display device on the abdomen of the pregnant woman;

receiving an input from a user, via the computer device, that indicates that the gender of the unborn baby is either male or female;

transmitting a gender revealing light sequence to the controller device, so that the gender revealing light sequence is displayed on the light display device being worn by the pregnant woman.

13. The method of claim 12, wherein the step of mounting the light display device on the abdomen of the pregnant woman is performed by providing a band, and fastening the band around the pregnant woman's abdomen, and then mounting the light display device on or under the band, so that the band holds the light display device in place on the pregnant woman's abdomen.

* * * * *